United States Patent
Goldhamer

(10) Patent No.: US 7,929,468 B2
(45) Date of Patent: Apr. 19, 2011

(54) METHOD FOR IMPROVING COEXISTENCE BETWEEN ADJACENT TDD AND FDD WIRELESS NETWORKS

(75) Inventor: Mariana Goldhamer, Ramat Gan (IL)

(73) Assignee: Alvarion Ltd., Tel-Aviv (IL)

( * ) Notice: Subject to any disclaimer, the term of this patent is extended or adjusted under 35 U.S.C. 154(b) by 100 days.

(21) Appl. No.: 12/495,975

(22) Filed: Jul. 1, 2009

(65) Prior Publication Data

US 2010/0002608 A1 Jan. 7, 2010

(30) Foreign Application Priority Data

Jul. 2, 2008 (IL) .......................................... 192584

(51) Int. Cl.
*H04J 3/00* (2006.01)
*H04J 1/00* (2006.01)
*H04W 4/00* (2009.01)
*H04B 7/212* (2006.01)

(52) U.S. Cl. ......... 370/280; 370/281; 370/330; 370/344

(58) Field of Classification Search .................. 370/280, 370/229–330, 342–343, 328, 344, 281; 375/346; 455/452.1, 63.2, 63.3
See application file for complete search history.

(56) References Cited

U.S. PATENT DOCUMENTS

| | | | | |
|---|---|---|---|---|
| 6,130,886 | A | * | 10/2000 | Ketseoglou et al. .......... 370/347 |
| 7,173,989 | B2 | * | 2/2007 | Lopes ........................... 375/346 |
| 7,177,598 | B2 | * | 2/2007 | Klein et al. .................. 455/63.1 |
| 7,580,387 | B2 | * | 8/2009 | Kayama et al. ............... 370/329 |
| 2004/0165547 | A1 | * | 8/2004 | Lopes ........................... 370/328 |
| 2005/0202824 | A1 | * | 9/2005 | Goldhammer ................ 455/447 |
| 2006/0215611 | A1 | * | 9/2006 | Nakagawa et al. ........... 370/332 |

* cited by examiner

*Primary Examiner* — Kwang B Yao
*Assistant Examiner* — Candal Elpenord
(74) *Attorney, Agent, or Firm* — Browdy and Neimark, PLLC

(57) ABSTRACT

A method for reducing interference between FDD and a TDD interfering radio networks including identifying respective radio entities for which the interferences should be reduced; defining a time pattern comprising time slots on each of the interfered channels, and receive time intervals for radio entities that may be interfered, and aligning the time patterns so that receive time intervals for the radio entities that are potentially exposed to interferences, overlap each other. The radio entity that might create interference to the radio entity of the pre-defined type of the other network, is prevented from transmitting communications that might create e substantial interference to the radio entity associated with the other radio network, and communications transmitted to some radio entities of the pre-defined types that might experience interference, are scheduled at intervals in which communications are received with substantially reduced interference.

6 Claims, 7 Drawing Sheets

METHOD FOR IMPROVING COEXISTENCE BETWEEN ADJACENT TDD AND FDD WIRELESS NETWORKS

FIELD OF THE INVENTION

The present invention relates generally to wireless communications, and in particular, to mitigation of interferences between FDD and TDD wireless networks.

BACKGROUND OF THE INVENTION

The fact that the frequency band that is allocated for wireless access systems is limited by nature dictates several restrictions that are imposed on the network operators, which may require the equipment manufacturers to provide creative solutions for exploiting the limited available licensed spectrum more efficiently. An example for such a solution may be found in WO 2006048873 that describes combining operations carried out according to an old technology together with operations under a new technology, instead of simply dividing the licensed frequency band into two sub-bands of frequencies, each allocated for transmissions compatible with one of the two technologies. By combining two technologies that utilize different PHY modes, the solution provided by WO 2006048873 enables smoothing the transition from one generation to another while providing an efficient solution to the utilization of the frequency band.

But shifting from one technology to another is not the sole reason for problems associated with the usage of a frequency band, due to the ever growing traffic and number of users that utilize a given frequency band. As a result, the cells become smaller and the interference problems more acute.

U.S. Pat. No. 7,177,645 describes a method for allocation of time-sub-frames for operating at frequencies that are subjected to interferences. The time frame is divided into two time sub-frames and the wireless links along which communications will be transmitted in each of these sub-frames are selected in such a way that during each sub-frame, none of the operative links will be subjected to interferences caused by communications transmitted during that sub-frame along any of the other links. Also, the time frames allocated for communication along the channels that experience interferences are divided into two time sub-frames, where one of the time sub-frames is reserved for communicating signals to/from subscriber terminals that are not subjected to interferences, while another time sub-frame is reserved for communicating radio signals to/from terminals that are subjected to interference. Time-Division Duplex (TDD) is the application of time-division multiplexing to separate outward and return signals. It emulates full duplex communication over a half duplex communication link. As the amount of uplink data increases, more bandwidth can dynamically be allocated to that and as it shrinks it can be taken away. Problems associated with coexistence of adjacent TDD networks are resolved by synchronizing the transmit and the receive intervals of the Base Stations, thereby eliminating both the BS-BS and SS-SS interference.

A special situation occurs in case of FDD/TDD collocated networks.

Frequency-division duplexing (FDD) technology means that the BS (Base Station) transmitter and the SS (subscriber station) transmitter operate at different carrier frequencies. The radio unit can work either in a full-duplex mode (transmitting and receiving in the same time) or in a half-duplex mode (transmitting and receiving at different times). In general, the Base Stations operates using a full duplex mode, while the subscriber operates in either a full-duplex mode or a half-duplex mode. The filters used in FDD full-duplex radios reject the transmitted frequency from the received signal, so that frequency separation resolves the BS-BS and SS-SS coexistence problems. The frequency separation is high enough to allow the realization of such radio filters.

Now, if a TDD based wireless network and an FDD based wireless network should coexist with each other, there might be severe interference problems due to the limited frequency separation, to the fact that the frequency gap between the operational frequencies of the two systems may be too small for realizing strong radio filters or due to roaming requirements for MSs, which should operate in any country over the whole available frequency band having a flexible partition between FDD and TDD operational frequencies, which do not allow to separate the FDD bands from the TDD bands by radio filters. Section 8.3 of the IEEE 802.16m System Requirements Document (IEEE 802.16m-07/002r4) emphasizes coexistence scenarios for a large number of various situations and technologies, including sharing of the same-licensed frequency band and coexistence with devices operating in adjacent LE ("license-exempt") bands. The interference problems associated with neighboring networks using the same band of frequencies are intensified when the networks are collocated. Collocated networks are networks that are deployed within the same geographical area, thus having a higher probability of interfering with each other.

In general, there are several scenarios in which coexistence of collocated systems might cause interference:

1. SS to SS Interference

Experienced for example in cases of small (e.g. 1 m) separation distance between two adjacent subscribers (referred to herein and throughout the specification as "SSs" or "MSs"), when one SS transmits communications within a time interval during which the other SS is in a state of receiving communications. In such a case, there is a high probability, especially in the case of FFD/TTD collocated systems, that harmful interference are experienced by the receiving SS. This is the most problematic case, because the levels of out-of-channel emissions are high and the RF (radio) filters may be inefficient for radios operating at adjacent frequency bands or non-existing for radios operating in adjacent frequency channels. Additionally, the radio front-end could be saturated. The SS-SS interference can be also experienced in cases where the separation distance between the two collocated radios is significantly higher than 1 m mentioned above.

2. SS to BS/Relay Interference

Experienced by BS or Relay in cases where the distance between a foreign SS and a BS is relatively small.

3. BS/Relay to BS/Relay Interference

Experienced in cases of collocated TDD-FDD wireless networks (e.g. WCDMA and 802.16m or LTE and 802.16) or un-synchronized TDD (i.e. LTE and 802.16m).

4. BS/Relay to SS Interference

Experienced by SS when the distance between the SS (being a foreign SS) and a BS are relatively small.

Thus, there is a need for a method for reducing the interference occurring in collocated networks operating in compliance with different technologies and different spectrum access methods.

SUMMARY OF THE INVENTION

It is an object of the present invention to provide a new approach for improved coexistence between collocated wireless networks implementing different technologies and utilizing adjacent frequency channels and/or frequency bands in FDD and TDD modes.

It is another object of the present invention to enable synchronization between radio networks that use different technologies.

Other objects of the invention will become apparent as the description of the invention proceeds.

According to a first embodiment of the present invention, there is provided a method for reducing interference between at least two interfering radio networks, each comprising a plurality of radio entities, wherein at least one of the radio networks is operative in an FDD mode and at least one of the other radio networks is operative in a TDD mode. The method comprising:

for each of the at least one network operative in an FDD mode and the at least one network operative in a TDD mode, identifying respective radio entities for which interferences should be reduced, and wherein for each of the at least two networks, the respective radio entities are of a pre-defined type;

defining a time pattern (e.g. a time frame) composed of time slots on each of the interfered FDD and TDD frequency channels, that comprises receive time intervals for radio entities of the pre-defined types that are likely to be interfered while receiving communications transmitted thereto;

aligning the defined time patterns for each of the interfered FDD and TDD frequency channels so that the receive time intervals for at least two of the radio entities of the respective pre-defined types that are potentially exposed to interferences, overlap each other;

defining at least two types of time intervals within said time pattern on each frequency channel, wherein a first type of time intervals is adapted to enable radio entities to receive communications with substantially reduced interference and wherein a second type of time intervals is adapted for exchanging communications without mitigating interferences induced by radio entities transmitting during said time intervals, wherein at least one radio entity that might create interference to at least one radio entity of the pre-defined type associated with the at least one other radio network, is prevented from transmitting any communications that might create e substantial interference to the at least one radio entity associated with the at least one other radio network, and wherein communications transmitted to at least some of the radio entities of the pre-defined types that might experience interference from radio entities of the at least one other network, are scheduled at intervals of the first type.

According to a preferred embodiment of the invention, the duration of at least one time interval of the first type of a time pattern and the duration of at least one time interval of the second type of that time pattern, are dynamically modified. Preferably, the dynamic modification is carried out to comply with current traffic loads.

By yet another embodiment of the invention, the alignment of a time pattern associated with an FDD radio network, with a time pattern of a TDD radio network, is achieved by shifting the time pattern associated with one of the radio networks (e.g. the FDD) in order to synchronize it with a time pattern of the other one of the two radio networks. For example, the shifting may be done upon measuring the inter-network interferences.

In accordance with another embodiment of the invention, low power transmissions are allowed to be transmitted by the radio network potentially creating interference during at least one interval of the first type within a time pattern.

By still another embodiment of the invention the method further comprising a step of configuring the time pattern in accordance with a determination of the pre-defined type of radio entities that should receive communications during intervals of the first type.

According to another preferred embodiment, the radio entities of the pre-defined type that receive communications during the intervals of the first type, are entities that are potentially exposed to higher interferences than other radio entities of the same pre-defined type that are all associated with the same radio network.

BRIEF DESCRIPTION OF THE DRAWINGS

A better understanding of the present invention is obtained when the following non-limiting detailed description is considered in conjunction with the following figures.

DETAILED DESCRIPTION OF THE PRESENT INVENTION

Figure 1:
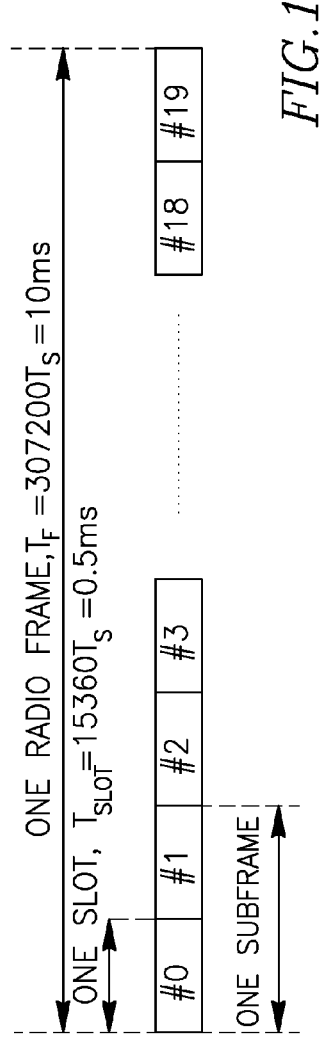
FIG. 1—presents a frame structure of an LTE FDD Frame.

The present invention will be understood and appreciated more fully from the following examples taken in conjunction with the accompanying drawings.

The following examples relate to the version IEEE 802.16m-08/003r3 of the IEEE 802.16m System Description Document, hence terms which need clarification beyond that which is provided herein, can be found in this document.

802.16m Coordinated Coexistence Frame (CXCF)

Duration of CXCF

The 802.16m Coordinated Coexistence Frame period is based on its Multi-frame structure, and includes frames and sub-frames. The CXCF (i.e. the operational time frame) length and structure depends on the technologies deployed in adjacent channels and adjacent bands. For resolving most of the coexistence problems in licensed operation, the CXF duration could be for example 20 ms or a multiplication thereof. For resolving problems of the LE operation deployed in adjacent bands to a licensed operation, including 802.11 and Bluetooth, etc., the CXCF duration could be 60 ms or 120 ms, due to the 15 ms Bluetooth frame duration and the preferred 100 ms inter-beacon interval for WiFi.

Structure of the CXCF

The CXCF structure may include two different types of allocations (in time domain) and silence intervals, as follows:

Protected allocations, for protecting the receive operation of SS, BS, RS or a combination thereof;

Un-protected allocations, which do not provide interference protection'

Silence intervals, during which there are no transmissions. The silence intervals are defined for one system in order to protect specific reception intervals of another collocated system.

The CXF structure depends on the scenarios considered in the protection target, as discussed under "the background of the invention" above. In general, harmful interference is created by a Subscriber Station (SS) to another SS, by generating a "receiver blocking" which is generally reciprocal. In other words, a radio, that experiences a blocking effect in its receive state, will also induce a "receiver blocking" effect to other devices, while being in transmission state, whereas receiver blocking is defined as degradation of the receiver's sensitivity level. In order to avoid the SS receiver blocking, it is suggested by the present invention to associate each network with its own protected allocations.

A network using its protected allocations will enjoy, during these time intervals, operation with reduced interference (improved coexistence).

It should be noted that all the CXCF examples illustrated below may also resolve the SS-SS interference, because due to the high level of the signal leakage in the first adjacent channel and the second adjacent channel (relative to frequency channel used for the radio system operation) and out-of-band emissions of a radio transmitter, this scenario has a high probability of apparition.

The CXCF structure shall preferably be designed such as to accommodate the technologies used by the collocated networks.

According to an embodiment of the invention, the defined allocations will preferably include a number of time slots in which the activities will be scheduled as follows:

a. time slots reserved for operation without harmful interference in the receive state of a BS, SS or Relay station (RS). In general, these time slots will preferably also include the reception of the control information sent for example by Base Station or Relays. These time slots form the protected allocations.

b. time slots for scheduling transmissions which will not suffer from interference. These time slots form the un-protected allocations.

Taking into consideration the separate transmissions and receptions of the BS, Relay and SS, we may end with at least three different protected allocations, each being composed of a pattern of sub-frames, as follows:

BS protected Rx allocation;
Relay protected Rx allocation;
SS protected Rx allocation.

Figure 2:
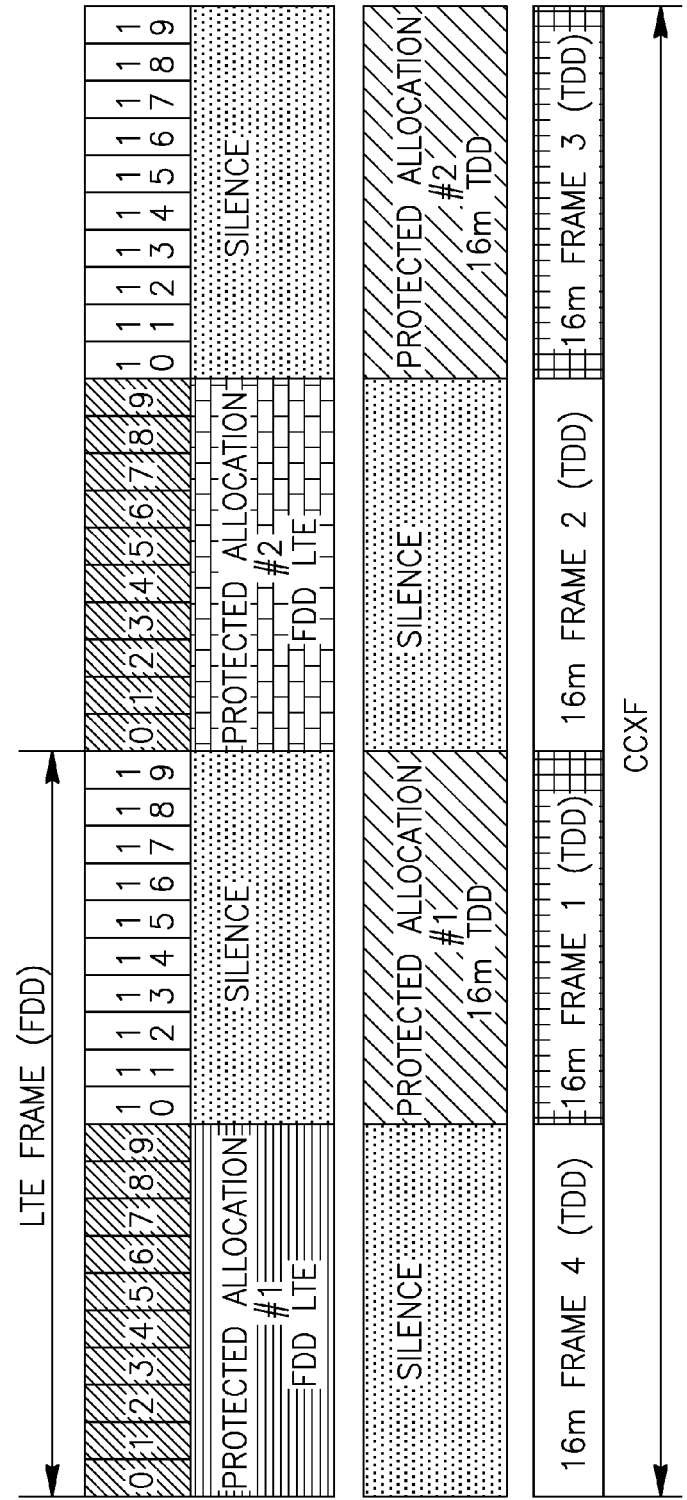
FIG. 2—presents a simplification of the FDD/TDD protected allocations.

A simplified approach of the above is provided in FIG. 2. As illustrated in this FIG., instead of allocating a complicated pattern of sub-frames, which may change from one operator to another and will be highly dependent on the traffic, one may allocate, whenever possible, time-slots having longer duration (e.g. approximately one full IEEE 802.16 frame).

The protected allocations for a specific location and frequency assignment should be defined while taking into account all the collocated networks and eventually each specific frequency channel. When considering the FDD-TDD type of interference, the TDD channels located next to an FDD receiver may induce strong interference only to this specific receiver. For example, if TDD based transmission is made within the duplex gap of the FDD allocations (e.g. the 2.5 GHz frequency arrangement in Europe) and the FDD Subscriber Station (SS) is transmitting along a frequency channel operative at the vicinity of the TDD BS operational frequency channel, the FDD SS may interfere with the reception activity of the TDD BS and TDD SS. On the other hand, the TDD BS will probably not interfere with the receive activity of the FDD SS, which is located far enough in the frequency domain.

The general rule for defining protected allocations according to an embodiment of the present invention is, to create time zones in which each specific receiver (SS, Relay or BS) is not affected by the transmissions of the adjacent networks. A good practice of implementing this rule is by stopping from time to time the transmissions that are responsible for creating interferences and scheduling during a time slot only those transmissions which do not interfere with each other. This way, the affected receiver may operate without interference.

In order not to impact the network operation in the time domain and to limit the delay for the protected operation, let us now consider the minimum required time for the CXF. If the granularity of the allocations is relatively high, as in IEEE 802.16 and LTE, one may define the protected allocations in the LTE frame based on IEEE 802.16 frame duration of 5 ms. However, if the resolution of the allocation cannot be lower than the duration of a frame associated with a given technology, as is the case with some FDD CDMA-based technologies having frame duration of 10 ms, the resolution of the protected allocation will be dictated by the technology used.

In practice there are a number of situations to be addressed and a solution that provides protection for all the elements of a network, might lead to a reduced operation time.

Examples of the CXCF Protected Allocations

The following examples present different modes for implementing the present invention while achieving improved coexistence between FDD and TDD systems. The examples assume synchronized FDD LTE according to 3GPP TS 36.211V8.2.0 (2008-03) 3GPP; Technical Specification Group Radio Access Network; Evolved Universal Terrestrial Radio Access (E-UTRA); Physical Channels and Modulation (Release 8), where the FDD operation of LTE uses the subframes as follows:

Let us first consider frame structure type 1 as shown in FIG. 1, where each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time, while there are no such restrictions in full-duplex FDD. For the 802.16 technology we use 5 ms frames for both TDD and FDD operation.

FIG. 2 illustrates a simplified approach of the solution provided by the present invention. In this figure we have two networks, one is based on 802.16 TDD (two lower rows) and one is based on LTE FDD (two upper rows). In the lower row the protected allocations of the TDD system are demonstrated whereas the upper row demonstrates the protected allocations of the FDD system. This example resolves all the coexistence scenarios (referred to hereinbefore) and introduces low delay (10 ms). The penalty is the reduction of the operation time for each network to 50%, i.e. the FDD/TDD protected allocations represent 50% average medium usage.

Figure 3:
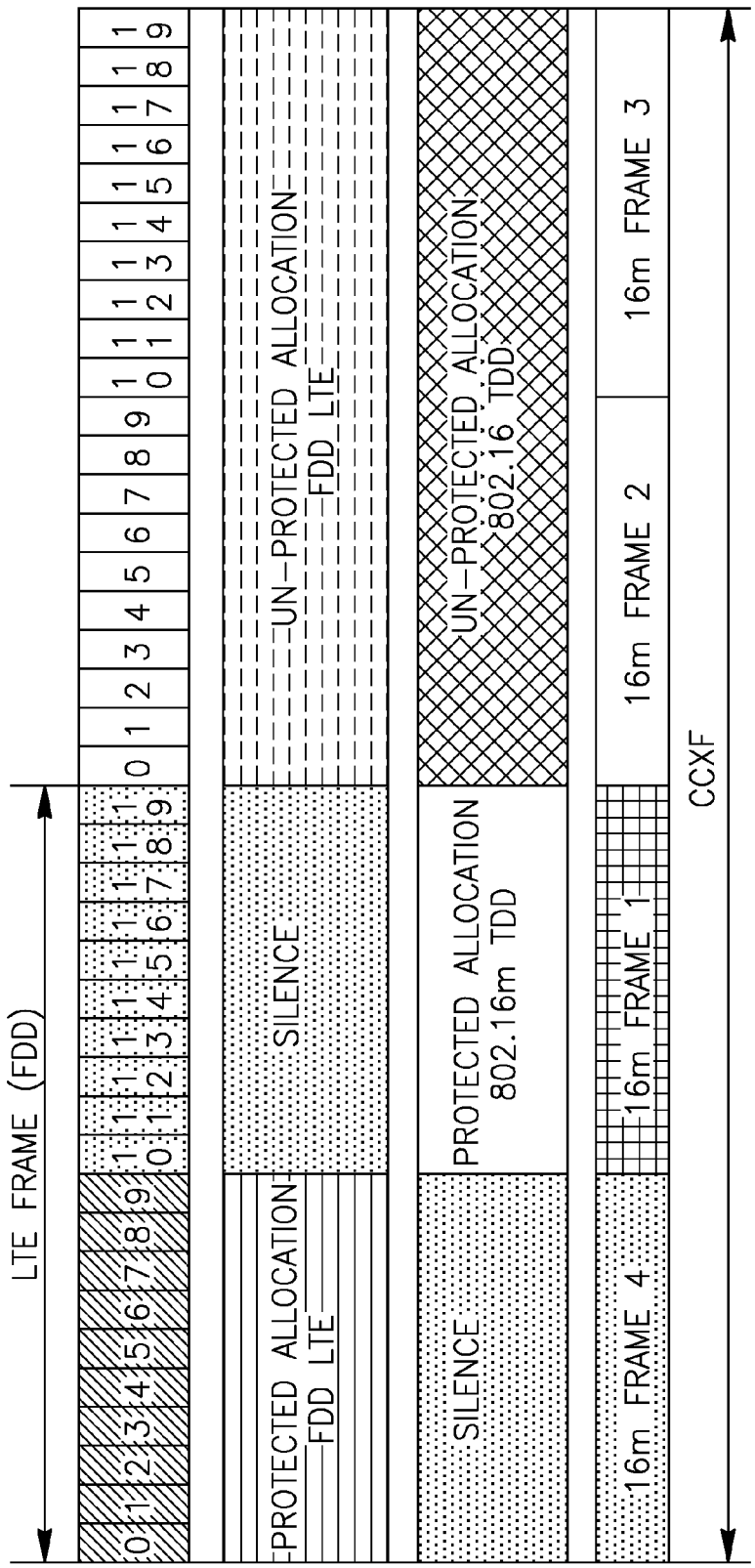
FIG. 3—illustrates an example of FDD/TDD protected and un-protected allocations.

FIG. 3 illustrates an example of FDD/TDD protected allocations resolving all scenarios, with 75% average medium usage, having a CXCF structure which improves the operational time of each network to 75%, with the penalty of increased delay for the network elements that create reciprocal interference. In this case, the scheduling entity will schedule the operation affected by interference during the protected allocations. The medium occupancy can be further improved if we reduce the targets of SS-SS and BS-BS reduced interference.

Figure 4:
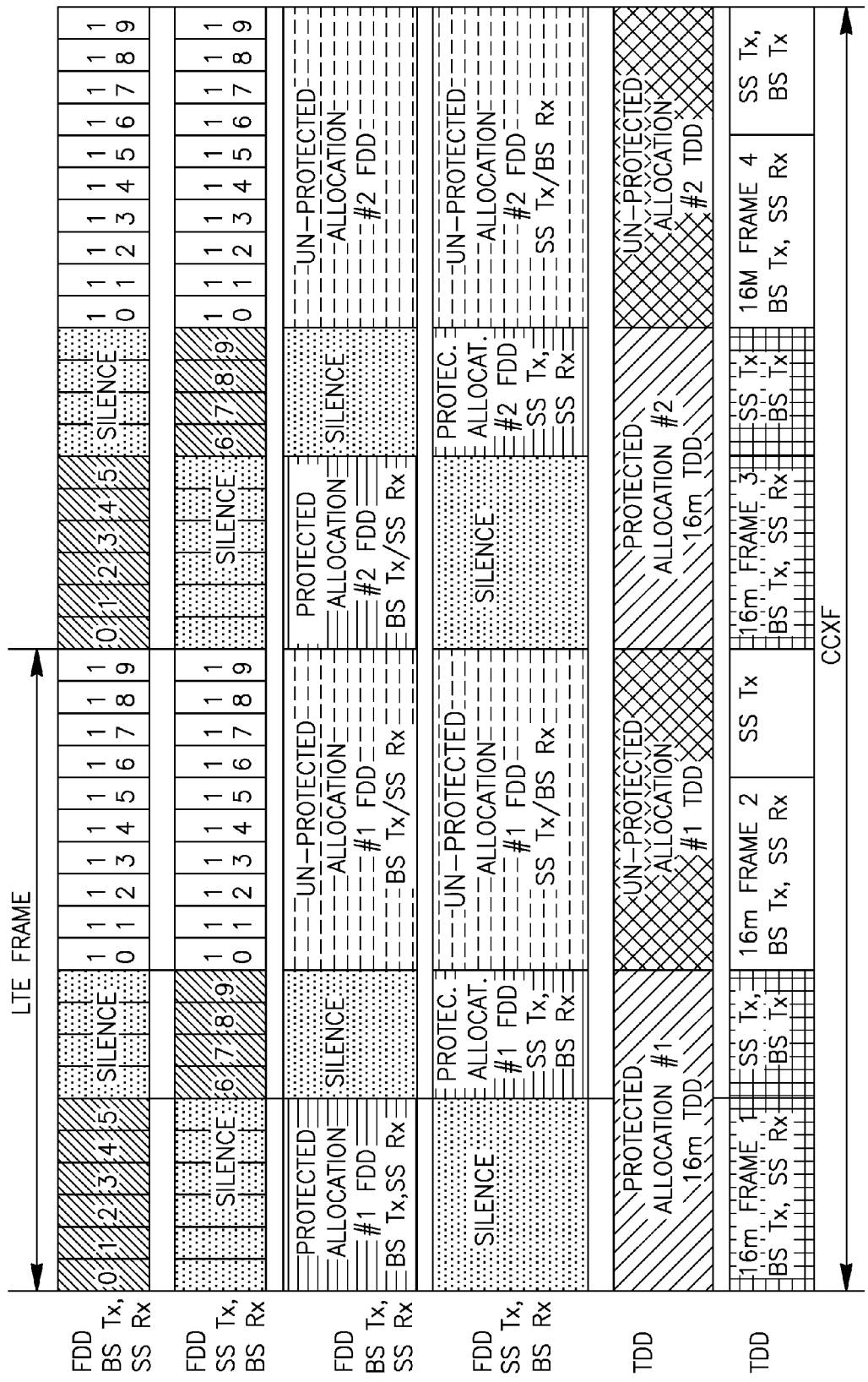
FIG. 4—illustrates a detailed example of FDD/TDD protected allocations adapted particularly for BS-BS and SS-SS coexistence in accordance with the present invention.

FIG. 4 is another example of FDD/TDD protected allocations, in the example the medium occupancy is 80% for the FDD BS, 70% for the FDD SS and 100% for TDD. The interval between the protected allocations is reduced to 10 ms. The principles for allocating the protected intervals are based on synchronization between:
1. FDD SS and TDD SS reception
2. FDD BS and TDD BS reception
3. Silence intervals were introduced to avoid transmissions creating interference.

The medium occupancy can be increased to 90% for the FDD BS and to 87% to the FDD SS, if the un-protected allocations during the second LTE frame are extended over the entire frame.

Figure 5:
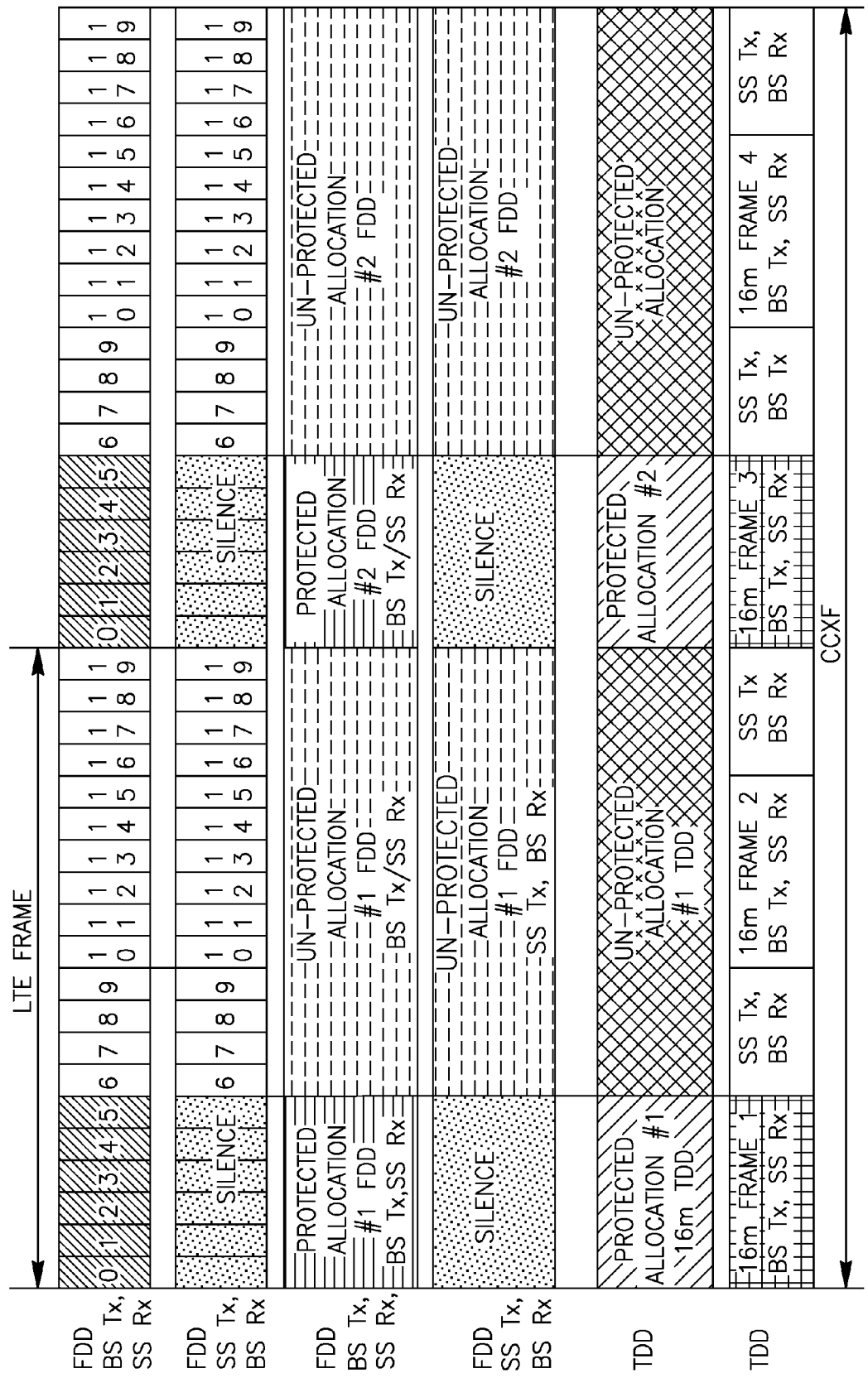
FIG. 5—presents another example of FDD/TDD coexistence that enables SS-SS coexistence in accordance with the present invention.

FIG. 5 presents yet another example of FDD/TDD coexistence, but this example is focused primarily on SS-SS coexistence. The synchronization is of the SS receiving intervals, as this would allow us to achieve maximum media occupancy and lowest delay.

Figure 6:
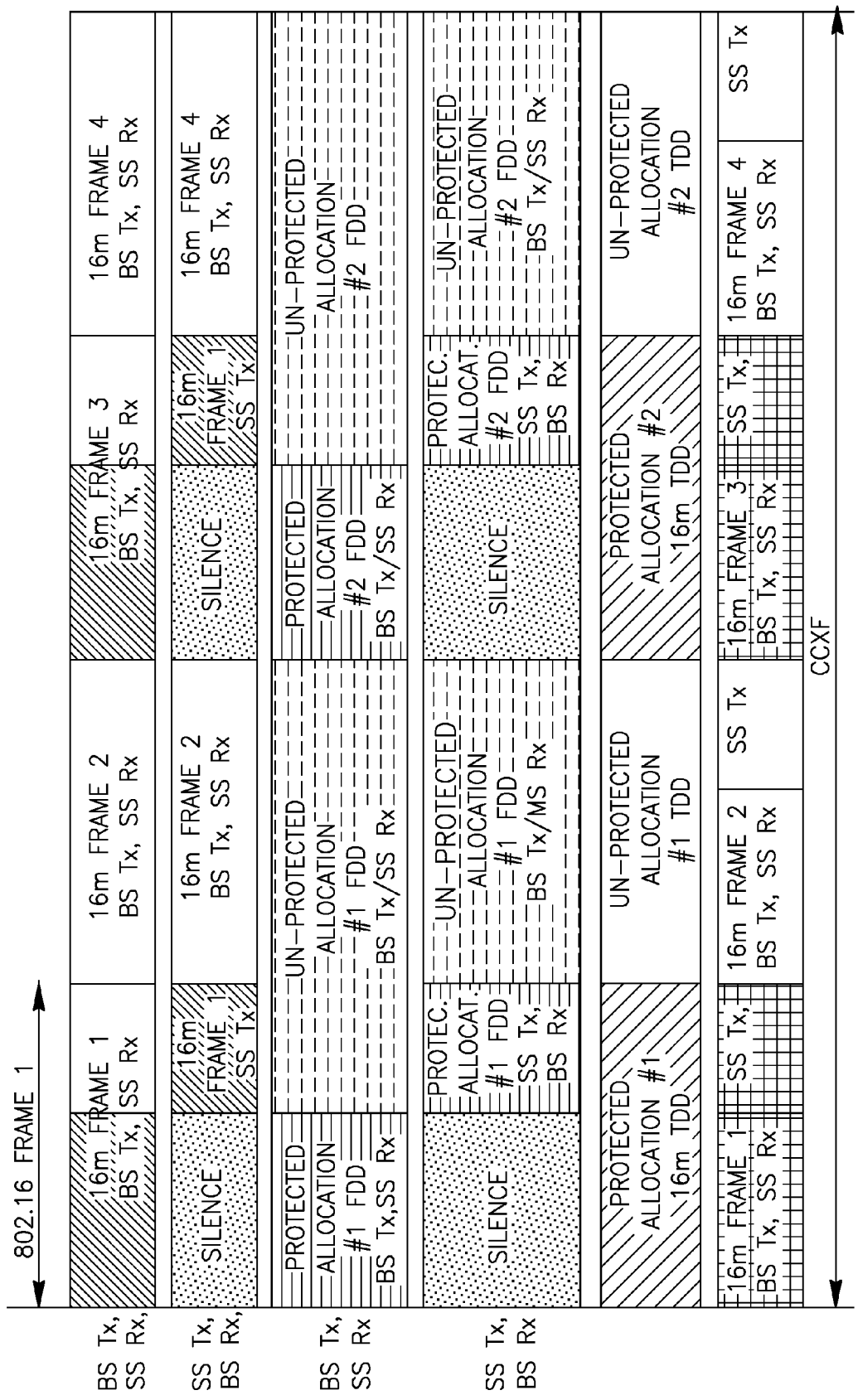
FIG. 6—presents an example of a case of FDD/TDD coexistence that enables BS-BS and SS-SS coexistence in IEEE 802.16 networks in accordance with the present invention.
Figure 7:
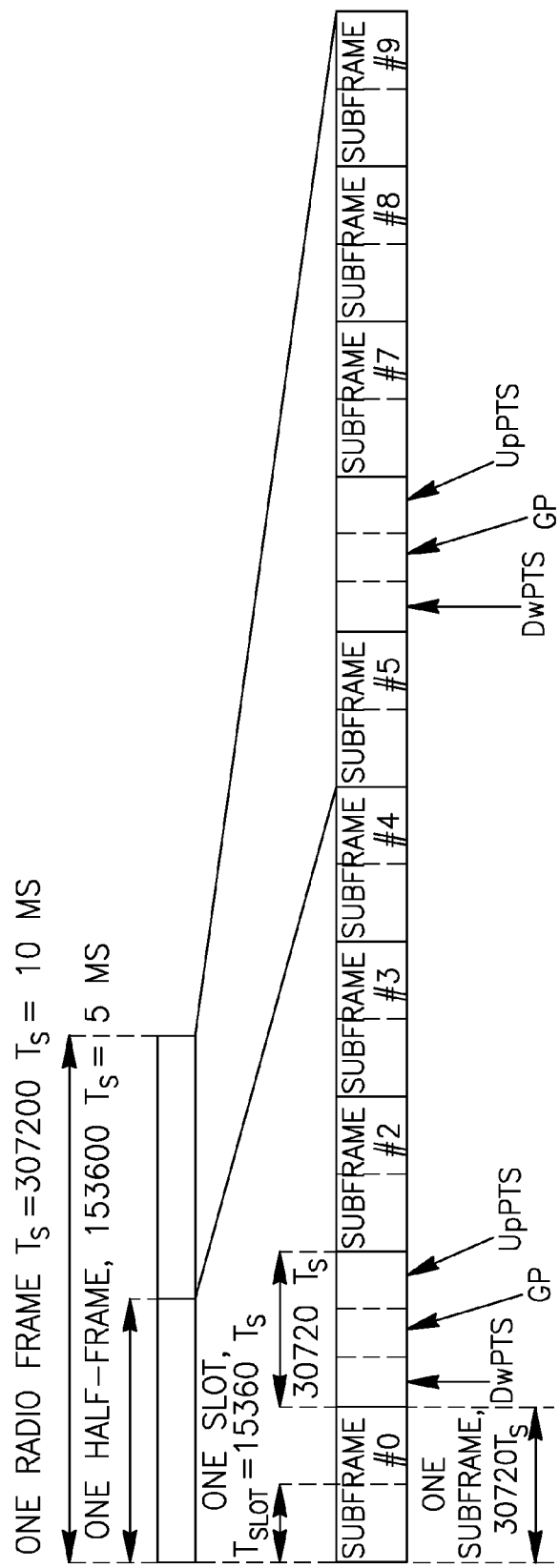
FIG. 7—presents the TDD frame structure of the LTE system.

In case of IEEE 802.16 FDD and IEEE 802.16 TDD networks, the solution is similar to that of the LTE case, where the LTE frame is replaced with two 802.16 frames. An example is demonstrated in FIG. 6.

Operation of Un-synchronized Networks

Typically, an un-synchronized system will not be able to take advantage of the CCXF protection described above.

The un-synchronized networks will be able to detect some of the transmissions of the synchronized networks as well as the intervals having minimum interference. Based on the a priori knowledge of the pattern and the durations of the time intervals reserved for the protected operation, such networks may be able to map the time graph of the detected harmful interference to the protected intervals used by synchronized networks.

A BS or Relay of an un-synchronized system will experience harmful interference mainly during the time-intervals reserved for the un-protected operation of other networks.

The best way to detect the network synchronization may be the time-shift of the frame start of the operation of the un-synchronized system until the reported interference becomes minimal.

EXAMPLE

Cognitive Information Related to CCXF

CCXF has elements of cognitive information. In this example, these elements are:
periodicity of the CCXF: 20 ms
duration and position of the intervals allocated for the TDD protected operation (relative to CCXF start)
DL/UL split.

An un-synchronized system may use the cognitive information related to the CCXF structure at its location for achieving synchronization.

TDD systems are the best choice to use the cognitive properties of the CXCF, due to the reciprocity the medium. For example, if one SS creates interference to another SS, it will also be a victim of interference itself.

Figure 8:
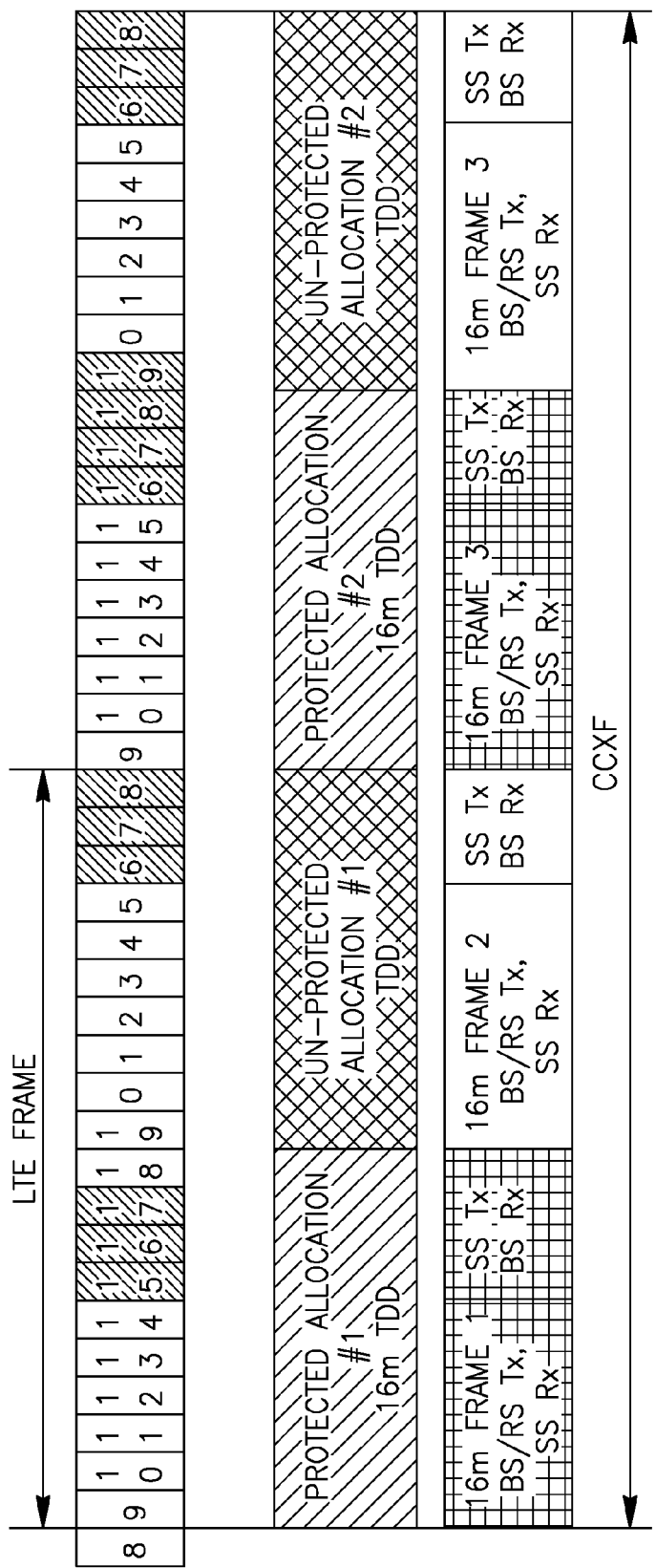
FIG. 8—presents an example of TDD interference experienced by SS within un-synchronized FDD network.

In order to further illustrate the example, let us suppose that the FDD system is not synchronized with CCXF. FIG. 8 illustrates the FDD SS reception and the harmful interference created by a TDD SS transmitting during its un-protected allocations. In this figure the FDD SS (using the LTE technology) is interfered by the TDD SS transmissions, but is not interfered by the TDD BS transmissions. FIG. 8 shows the interference pattern. A BS may assess the harmful interference during these slots, based on the individual SS reports of the interference pattern and the pre-known frame structure of the TDD operation.

The probability of detecting SS transmissions is increased if the intra-system power control is done in the frequency (OFDMA) domain, because in this way, no power patterns are created which may complicate the detection of SS transmission intervals, so the FDD system will detect one of the protected allocations of the TDD system. It should be noted that SSs are good indicators, because of their distribution throughout the field. However different implementations can develop specific detection methods of the CXCF elements.

Thus, the present invention enables reduced-interference operation of collocated systems using different frequencies by combining:
Procedures for the creation of an 802.16m Coordinated Coexistence Frame (CXCF), including protected intervals for the low-interference operation of the wireless networks affected by harmful interference.
Creation of cognitive radio properties for protected intervals
Cognitive properties may be dependent of the actual technologies to be used in a given band, in the adjacent bands and at a given location.
Synchronization of initially un-sync networks and their scheduling for reduced interference.

Harmful interference is generally defined as an interference which seriously degrades, obstructs, or repeatedly interrupts a radio-communication service. For sake of making the description of the present invention more concise, the problem of "receiver blocking" will be considered as the most harmful interference problem. Situations of "receiver blocking" appear between the devices located at the proximity of each-other and are created generally by a Subscriber Station (SS) working at the proximity of another SS), BS (base station) or a Relay. The SS may be mobile, nomadic or fix.

EXAMPLE

WiFi Synchronization with CCXF Based on Cognitive CXCF Information

After establishing the timing of one CCXF protected allocation, an un-synchronized WiFi BS/AP will be able to synchronize its operation with CXCF. An unsynchronized BS may also use the time-shift of its protected scheduling in order to find a best timing match for operating with reduced interference.

A special case is represented by the radio devices provided simultaneous radio services using adjacent frequency bands (collocated radio coexistence). Such a device may be connected to a synchronized BS which is aware of the CXCF structure at that specific location. If we suppose that in an adjacent frequency band operates a WiFi AP (Access Point) to which is connected the dual-mode device, this device can inform the AP about the timing of the CXCF and the timing of the protected allocations for WiFi operation.

WiFi can also detect the periodicity of the harmful interference. If a well known CXCF is defined for the bands adjacent to the WiFi operation, it will be possible that future WiFi devices, operating at 2.4 GHz, will not create harmful interference to devices using license-bands and situated at WiFi proximity (2.5 GHz or 2.3 GHz). The operation in special licensed bands, as 3.65 GHz in the USA, can also benefit from the cognitive characteristics of the coordinated coexistence frame.

For convenience and ease of explanation, many of the embodiments discussed in this disclosure are described in terms of their application in an IEEE 802.16-based network. The use of 802.16 terminology should not be construed as limiting the invention to embodiments within those domains. Rather the invention's applicability to any managed wireless network will be evident to one skilled in the art and the use of the example terminology is only to aid the reader in understanding various aspects of the invention.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications mentioned in this specification are herein incorporated in their entirety by reference into the specification, to the same extent as if each individual publication was specifically and individually indicated to be incorporated herein by reference.

The invention claimed is:

1. A method for reducing interference between at least two interfering radio networks, each comprising a plurality of radio entities, wherein at least one of the radio networks is operative in frequency division duplex (FDD) mode and at least one of the other radio networks is operative in a time division duplex (TDD) mode, said method comprising: for each of said at least of the radio networks operative in the FDD mode and said at least one of the radio networks operative in the TDD mode, identifying respective the radio entities for which interferences should be reduced, and wherein for each of the at least two networks, the respective radio entities are of a pre-defined type; defining a time pattern composed of time slots on each of the interfered FDD and TDD frequency channels, said time pattern comprising receive time intervals for the respective radio entities of the pre-defined types that are likely to be interfered while receiving communications transmitted thereto; aligning said defined time patterns for each of FDD frequency channel and a TDD frequency channel interfering therewith so that said receive time intervals for at least two of the respective radio entities of the pre-defined types that are potentially exposed to interferences, overlap each other; defining at least two types of time intervals within said time pattern on each of the FDD and TDD frequency channels, wherein a first type of time intervals is adapted to enable at least one of the radio entities to receive communications with substantially reduced interference and wherein a second type of time intervals is adapted for exchanging communications without mitigating interferences induced by at least one other of the radio entities transmitting during said time intervals, wherein at least one radio entity that might create interference to at least one of the radio entities of the pre-defined type associated with the at least one other radio network, is prevented from transmitting any communications that might create substantial interference to said at least one radio entity associated with the at least one other radio network, and wherein communications transmitted to at least some of the radio entities of the pre-defined types that might experience interference from others of the radio entities of the at least one other network are scheduled at intervals of the first type.

2. A method according to claim 1, wherein the duration of at least one time interval of the first type of the time pattern and the duration of at least one time interval of the second type of that time pattern, are dynamically modified.

3. A method according to claim 2, wherein the dynamic modification is carried out to comply with current traffic loads.

4. A method according to claim 1, wherein the alignment of a time pattern associated with an FDD radio network, with the time pattern of a TDD radio network, is achieved by shifting the time pattern of one of said time patterns in order to synchronize it with a time pattern of the other one of the two radio networks.

5. A method according to claim 1, wherein low power transmissions are allowed to be transmitted by the radio network potentially creating interference during at least one interval of the first type within the time pattern.

6. A method according to claim 1, wherein at least one of the radio entities of the pre-defined type that would receive communications during said intervals of the first type, are radio entities that are potentially exposed to higher interferences than other radio entities of the same pre-defined type associated with the same radio network.

* * * * *

UNITED STATES PATENT AND TRADEMARK OFFICE
CERTIFICATE OF CORRECTION

| | |
|---|---|
| PATENT NO. | : 7,929,468 B2 |
| APPLICATION NO. | : 12/495975 |
| DATED | : April 19, 2011 |
| INVENTOR(S) | : Mariana Goldhamer |

It is certified that error appears in the above-identified patent and that said Letters Patent is hereby corrected as shown below:

At claim 1, column 9, line 49, insert the word --one-- after "at least".
At claim 1, column 9, line 49, insert the word --is-- after "networks".
At claim 1, column 9, line 51, delete the word "the" before the word "radio".

Signed and Sealed this
Seventh Day of June, 2011

David J. Kappos
*Director of the United States Patent and Trademark Office*